United States Patent [19]

Jonsson

[11] 4,146,287

[45] Mar. 27, 1979

[54] LIGHTING AND POWER SYSTEM AND CONNECTORS THEREFOR

[75] Inventor: Nils G. Jonsson, Woburn, Mass.

[73] Assignee: National Service Industries, Inc., Atlanta, Ga.

[21] Appl. No.: 840,176

[22] Filed: Oct. 7, 1977

[51] Int. Cl.² .................... H01R 13/59; H02G 3/02; H02G 15/06
[52] U.S. Cl. .................................. 339/75 M; 52/28; 174/49; 339/29 R; 339/156 R
[58] Field of Search .............. 339/75 M, 23, 28, 29 R, 339/156 R, 157 R, 164 R; 174/48, 49; 52/28; 362/147, 148, 150, 226

[56] References Cited

U.S. PATENT DOCUMENTS

| | | | |
|---|---|---|---|
| 3,715,627 | 2/1973 | D'Ausilio | 339/156 R X |
| 3,719,768 | 3/1973 | Jonsson | 174/49 |
| 3,745,515 | 7/1973 | Michaels | 339/156 R |
| 3,852,701 | 12/1974 | Minitz | 339/156 R X |
| 3,963,300 | 6/1976 | Patton et al. | 339/156 R |

Primary Examiner—Roy Lake
Assistant Examiner—E. F. Desmond

Attorney, Agent, or Firm—Oliver E. Todd, Jr.

[57] ABSTRACT

An improved relocatable wiring system for supplying lighting and power to a floor area in a building is disclosed. A plurality of lighting fixtures installed in a ceiling structure for lighting the floor area are connected in one or more branch circuits. Each branch circuit is defined by a plurality of plural conductor branch circuit cables which distribute power to the fixtures. Connectors are permanently attached to the opposite ends of each branch circuit cable. A connector at one end of a cable is joined to a connector on the next cable in the branch circuit by a circuit connector module having two receptacles keyed to receive and interconnect the two connectors. The circuit connector module also has a connector which mates with a receptacle permanently attached to a lighting fixture, which connector is in turn connected to a lighting circuit in the fixture. A modified circuit connector module has an additional receptacle which is connected through a circuit cable to a wall switch for switching power to one or more fixtures in the branch circuit. Relocatable branch circuits also supply power to the building floor area.

6 Claims, 25 Drawing Figures

FIG. 1

LIGHTING AND POWER SYSTEM AND CONNECTORS THEREFOR

BACKGROUND OF THE INVENTION

This invention relates to lighting and power systems and more particularly to an improved relocatable system in which power distribution to lighting fixtures and to a building floor area is easily modified to meet changing requirements.

Fluorescent lighting fixtures are generally used for illuminating floor areas in commercial buildings due to their efficiency as compared to other light sources, although other types of light sources such as incandescent lamps or high intensity discharge (HID) lamps or a combination of different types of lighting sources may be used. In modern construction of commercial buildings such as store and office buildings, ceiling structures generally comprise suspended ceilings which include a suspended grid system which supports ceiling panels such as fiberglass tiles. The plenum space above the suspended ceiling is used for distribution of conditioned air and electrical power to the area below the ceiling. Where the area consists of a large open area such as in a large retail store, lighting fixtures may be suspended from the grid structure which supports the ceiling tiles. However, lighting fixtures of this type are not economical or pleasing in appearance where the floor space is to be divided into a number of offices or where the ceiling is relatively low. In such cases, lighting fixtures are typically recessed into the suspended ceiling such that a lighting diffuser on each fixture extends substantially coplanar with the ceiling. In many cases, the suspended ceiling is installed prior to partitioning a floor area into individual office spaces. The use of recessed fluroescent lighting fixtures for lighting the floor area facilitates partitioning the floor area into office spaces either without moving or with a minimum moving of the lighting fixtures which are recessed into the ceiling. After the floor area is partitioned into individual offices or rooms, the lighting fixtures often must be rewired to permit switching the fixtures in each room independent of the fixtures in the remaining rooms. The rewiring of lighting fixtures adds considerably to the expense of installing the lighting system in the building. This expense is normally borne by the lighting contractor who must bid competitively for a contract to install and modify the lighting system. However, the contractor must place his bid without knowing his actual modification expense since at the time the bid is placed, the contractor may have no information on the final floor plan for the building for which he is placing the bid.

In my prior U.S. Pat. No. 3,719,768 which issued on Mar. 6, 1973, a system is disclosed which facilitates rewiring lighting fixtures after room partitions are installed. In the system disclosed in this patent, flexible electrical cords are used for connecting electrical switches and outlets mounted in wall panels with power distribution boxes and control relays located above a suspended ceiling. The power distribution boxes and relays are also connected to lighting fixtures. This system has the advantage of providing prewired wall panels which may be readily installed for partitioning a floor area into office spaces. However, the physical wiring above the suspended ceiling must be modified when the wall panels are installed in order to interconnect all lighting fixtures over a partitioned office with a wall switch. Considerable labor and expense may be required for modifying the wiring when the wall partitions are installed.

Another prior art system is shown in U.S. Pat. No. 3,683,101 which issued to Aug. 8, 1972 to Milton Liberman. In the Liberman system, prewired lighting fixtures are plugged into prewired receptacles on channels which are integral with some of the inverted T-support or grid members for a suspended ceiling. Installation of a system of this type requires less labor over systems which are entirely hand wired on the site. However, connections to the wiring in the channels must be changed when switching requirements change, as when a space below the suspended ceiling is partitioned or a partition is relocated. Furthermore, the prewired channels do not readily adapted to the switching of power to some fixtures plugged into a channel while leaving unswitched other similar fixtures plugged into the same channel, unless separate wires are run to each channel receptacle. Finally, since the channels generally are installed before the final floor plan is known, a number of the channels may ultimately be unused. This results in an increase in the installation expense for a system of this type.

Still another system is shown in the U.S. Pat. No. 4,001,571 which issued Jan. 4, 1977 to Myron D. Martin. This patent discloses a lighting system in which groups of lighting fixtures are arranged in branch circuits. A separate branch circuit cable extends between each two adjacent fixtures in the branch circuit. Electrical connections from the branch circuit cable to the lighting fixture and between two interconnected branch circuit cables are modified by inserting adapters between either the cables and the fixture or between two successive cables in the branch circuit. Adapters are also used for switching one or more of the fixtures in the branch circuit. However, this system is not readily adaptable for applications other than lighting.

SUMMARY OF THE INVENTION

According to the present invention, an improved system for lighting and supplying power to a floor area in a building is designed such that the control and location of various lighting fixtures and power outlets is readily modified. Lighting fixtures mounted in a suspended ceiling for lighting the floor area in the building are arranged into one or more branch circuits. A branch circuit is defined by a plural conductor electrical circuit formed from branch circuit cables connected from an outlet in a power supply box to a first lighting fixture in a branch circuit and thence connected from fixture to fixture in the branch circuit. Each branch circuit cable has an output connector adapted to engage an output receptacle and an input connector adapted to engage an input receptacle. The input connector on one branch circuit cable and the output connector on the next branch circuit cable are connected together by a circuit connector module which also includes a connector which engages a receptacle permanently mounted on a lighting fixture or other device requiring power. The outer housings for the input and output connectors on the branch circuit cables and the housing for the receptacles and connector in the circuit selector module are keyed to prevent erroneous connections when installing the lighting system. Different size or keyed connector and receptacle housings are also designed for different voltages to prevent applying the wrong voltage to a lighting fixture or other circuit component. The circuit is simplified by using identical electrical terminals and insulator blocks in each connector and receptacle with the keying being provided in the different connector housings as distinguished from the prior art connectors which provide keying by terminal arrangement and insulator design. All terminals are recessed within the insulator blocks to eliminate a possible hazzardous condition when modifying the system while power remains on.

In addition to supplying power to lighting fixtures, the system is readily adaptable to supplying other electrical needs. For example, as wall partitions are moved within a building to modify room location and layout, the system is suitable for modifying connections to electrical outlets in the wall partitions and to changing the location of wall switches for controlling either the outlets or the lighting.

Accordingly, it is an object of the present invention to provide an improved system for supplying power to a building in which the power requirements may change.

Another object of the invention is to provide an improved system for supplying power to lighting fixtures which permits changing the electrical connections to the different fixtures as room layout within the building is changed.

Another object of the invention is to provide an improved system for supplying power to a building in which electrical connectors for relocatable power applications are keyed to prevent erroneous power connections.

Other objects and advantages of the invention will become apparent from the following detailed description, with reference being made to the accompanying drawings.

DESCRIPTION OF THE PREFERRED EMBODIMENTS

Figure 1:
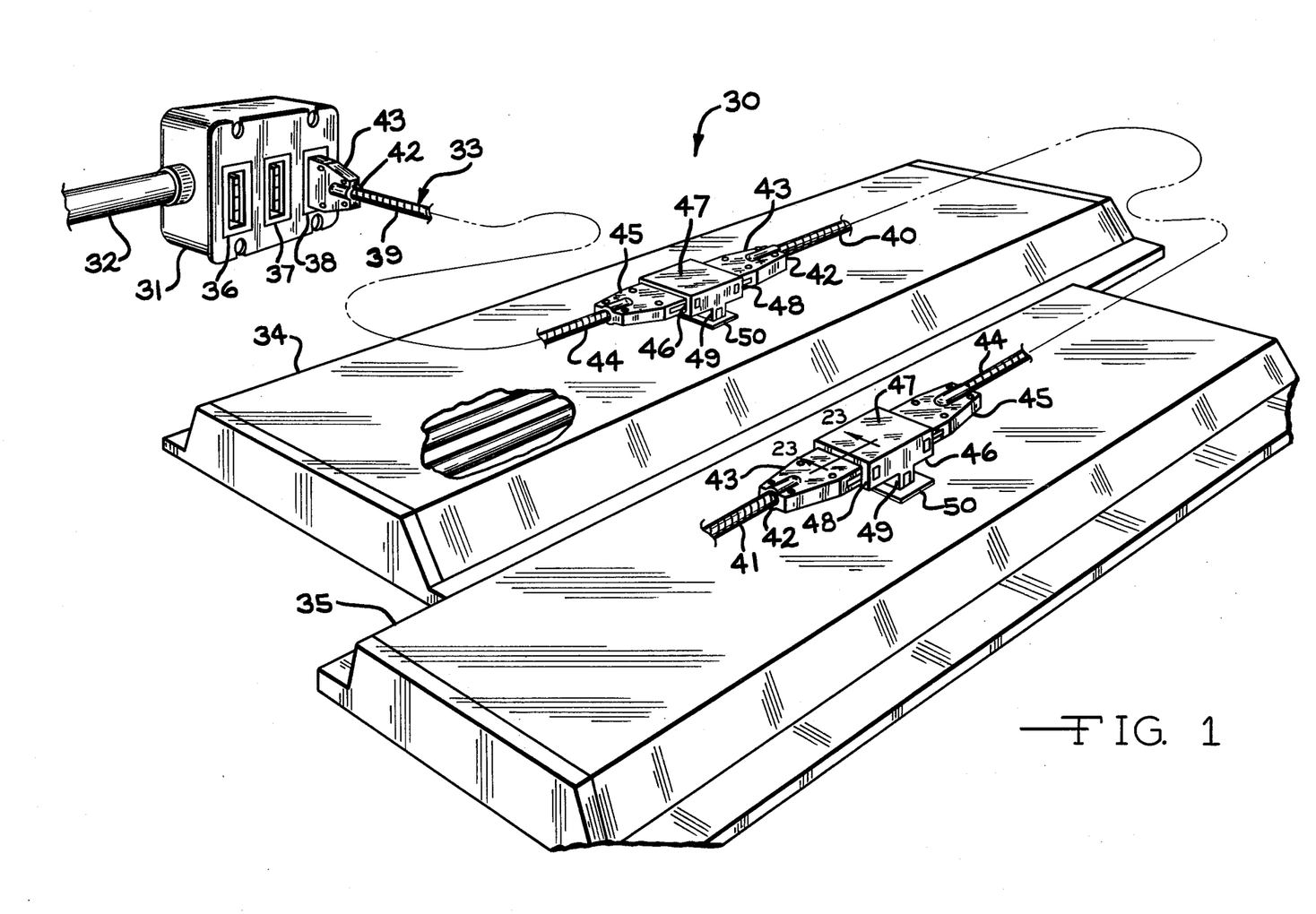
FIG. 1 is a fragmentary perspective view of a portion of a relocatable lighting system constructed in accordance with the present invention and in which two fluorescent lighting fixtures are connected in a branch circuit.
Figure 2:
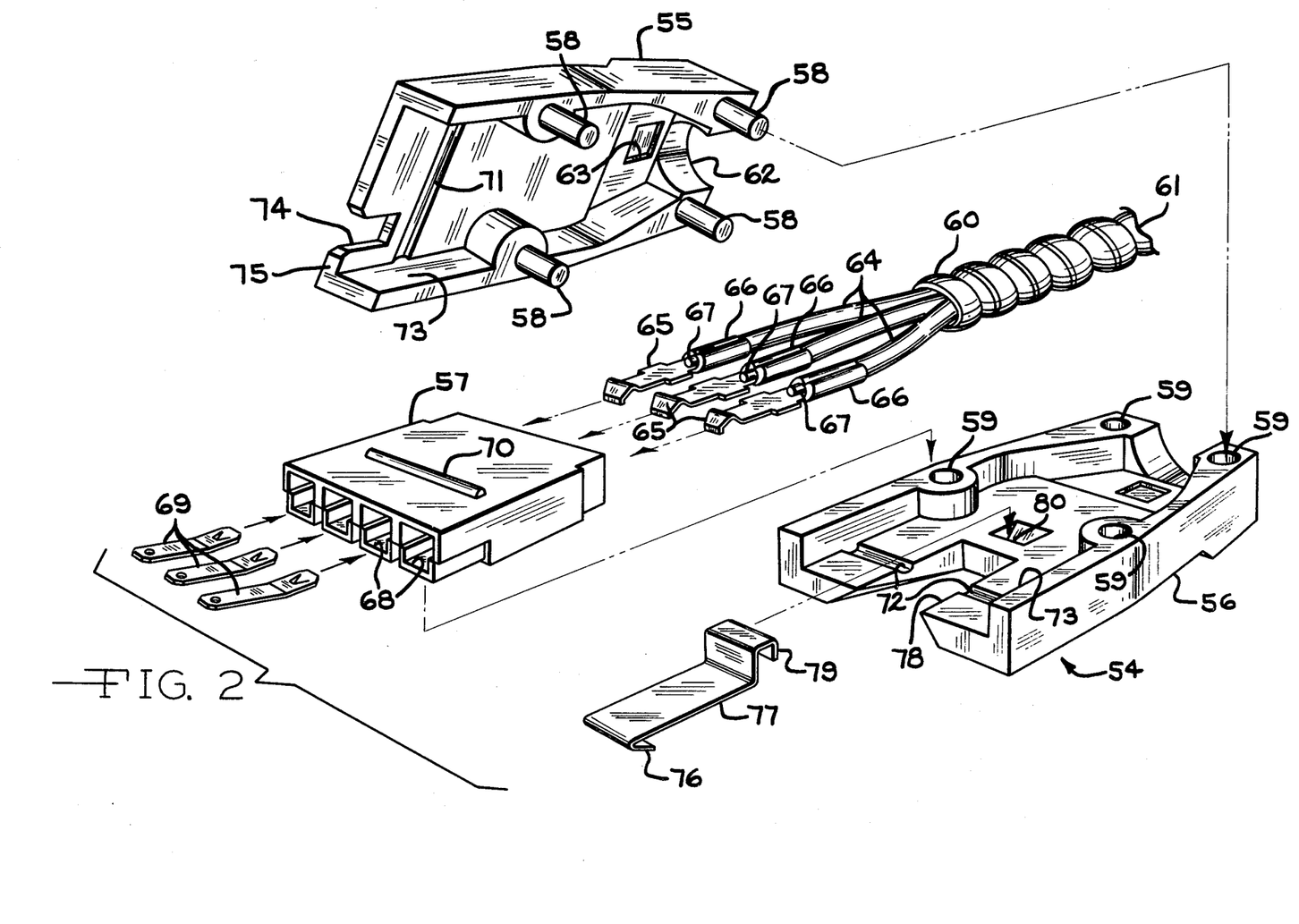
FIG. 2 is an exploded perspective view of a first embodiment of a connector for the system of the present invention.

Turning now to the drawings and particularly to FIG. 1, a fragmentary portion of a lighting system 30 is shown in perspective. The portion of the lighting system 30 shown includes a junction box 31 connected through a conduit 32 to a commercial power main and a branch circuit 33 which includes two lighting fixtures 34 and 35 which receive power from the junction box 31. The junction box 31 is shown as containing three receptacles 36–38 which are permenantly connected to wires in the conduit 32. Each of the receptacles 36–38 supplies power to a separate branch circuit, with the receptacle 38 supplying power to the exemplary branch circuit 33. The branch circuits connected to the receptacles 36 and 37 may be connected to lighting fixtures or to other devices, such as wall outlets.

The branch circuit 33 includes a plurality of branch circuit cables, with exemplary cables 39–41 shown in fragmentary. Each of the cables 39–41 has an end 42 terminating an output connector 43 and an input connector 45. As used herein, connectors supplying power to an input receptacle are termed input connectors and connectors receiving power from an output receptacle are termed output connectors. On a first branch circuit cable 39, the output connector 43 engages the output receptacle 38 on the junction box 31 and the input connector 45 engages an input receptacle 46 on a circuit connector module 47. The circuit connector module 47 has an output receptacle 48 which engages the output connector 43 on the next branch circuit cable 40. The circuit connector module 47 also has an input connector 49 which engages an input receptacle 50 permanently attached to the lighting fixture 34. A similar input receptacle 50 is also permanently mounted on the lighting fixture 35. The receptacles 50 are permanently wired to supply power to a lighting circuit in each of the lighting fixtures 34 and 35. It should be noted that the circuit connector module 47 is designed along with the connectors 43 and 45 to require a minimum clearance above the lighting fixture 34, typically no more than two inches.

A circuit connector module 47 also is connected to the lighting fixture 35 by means of an input connector 49 which engages the input receptacle 50 on the fixture 35. The input connector 45 on the branch circuit cable 40 engages the input receptacle 46 on the circuit connector module 47 connected to the fixture 35 and the output receptacle 48 on such circuit connector module 47 receives an output connector 43 on the next branch circuit cable 41. Thus, the branch circuit cables 39, 40, 41, etc., of the branch circuit 33 are interconnected by the circuit connector modules 47 to form a complete circuit from the junction box 31 to but not through the lighting fixtures 34, 35, etc. Other branch circuits are similarly assembled and connected to the receptacles 36 and 37 in the junction box 31. Normally, the circuit connector modules 47 form a series circuit between two adjacent branch circuit cables, such as the cables 39 and 40, or the cables 40 and 41. The circuit connector modules 47 also connect power from the branch circuit cables to one of the lighting fixtures 34, 35, etc. It will be noted that the circuit connector module 47 may be disconnected from the lighting fixture by removing the connector 49 from the receptacle 50 mounted on the lighting fixture. Even though a particular one of the lighting fixtures is disconnected, continuity in circuit connections from the junction box 31 to the remaining lighting fixtures in the branch circuit will be uninterrupted. This permits servicing a particular one of the lighting fixtures in a branch circuit without the need to remove power from the entire branch cicuit. In the event of a defective lighting fixture, a substitute lighting fixture may be quickly installed in the branch circuit without interrupting the power to other lighting fixtures in the branch circuit. The defective fixture then may be serviced with a minimum amount of interruption to personnel using the illuminated floor area beneath the replaced lighting fixture. It should be noted here that power to one or more of the lighting fixtures in the branch circuit may be switched by providing a modified circuit connector module for interconnecting two branch circuit cables and or connecting the branch circuit to a lighting fixture. The modified circuit connector module includes switching terminals which are connected to an external wall switch, as will be discussed in greater detail below with reference to FIG. 24. Also, the use of the branch circuit 33 for supplying power to other appliances and to wall outlets will be described in detail below. In other words, the lighting system 30 shown in the exemplary FIG. 1 may also be adapted as a complete relocatable wiring system capable of supplying both the lighting and power needs for a building area and also capable of easy relocation as wall partitions and lighting and power needs change.

Turning now to FIGS. 2–6, construction details are shown for an input connector 54 which is suitable for use as the input connectors 45 in FIG. 1 in the branch circuit cables requiring up to three circuits. The connector 54 generally includes first and second housing sections 55 and 56 which enclose an electrical insulator block 57. The first housing section 55 is provided with a plurality of pins 58 which pass through aligned openings 59 in the second housing section 56 when the housing sections 55 and 56 are assembled together. The pins 58 are then swaged or otherwise deformed to permanently connect the housing sections 55 and 56 together. When the housing sections 55 and 56 are connected together, an end 60 of a flexible, shielded cable 61 passes through an opening 62 and is clamped between the housing sections 55 and 56. The cable end 60 is received by recesses 63 in the housing sections 55 and 56 to firmly connect the cable 61 to the connector 54. Wires 64 extend from the end of the shielded cable 61 of which three are shown. However, the exemplary insulator block 57 is capable of receiving up to four wires 64. Of the three wires 64 shown in FIG. 2, two are power carrying wires and a third is a ground wire. A separate terminal 65 is crimped at 66 onto an electrical conductor 67 at the end of each of the wires 64. Each of the individual terminals 65 is received by a separate opening 68 in the insulator block 57 and is retained in such opening 68 by means of a spring clip 69, as will be discussed in greater detail below. The insulator block 57 is provided on its exterior surface with a pair of ribs 70, of which only one appears in FIG. 2. One of the ribs 70 engages a groove 71 in the first housing section 55 and the other of the ribs 70 engages a groove 72 in the second housing section 56. When the housing sections 55 and 56 are assembled together, the ribs 70 and grooves 71 and 72 firmly retain the insulator block 57 within an opening 73 defined between the housing sections 55 and 56.

Erroneous connection between the various electrical connectors and receptacles forming the branch circuit 33 of FIG. 1 is prevented through the use of keying formed between the connector housings and the receptacle housings. The insulator blocks and terminal arrangements in each two mating connectors and receptacles are identical, with only the insulator blocks and terminals being reversed 180° with respect to each other to permit interconnection. This arrangement greatly reduces the cost of manufacturing the individual connectors and receptacles. The keys are formed in the metallic housings, as distinguished from the insulator block which may be considerably more brittle and susceptible to breakage when a forced connection is attempted. Also, the terminals for both the connectors and the receptacles are recessed in the insulator blocks. This greatly reduces the risk to personnel when modifying connectors in a live circuit. In the connector 54 shown in FIGS. 2–6, the keying consists of a single rectangular groove or notch 74 formed in an edge 75 of the first housing section 55. The connector 54 will only be received by a receptacle having an inverted insulated block with respect to the insulator block 57 and a corresponding single key which aligns with the notch 74. If the key misaligns or if multiple keys are provided, then a technician assembling the lighting system 30 cannot make an erroneous power connection. Once a connector 54 is inserted into a mating receptacle, a catch 76 on a spring 77 engages the housing for such receptacle to retain the connector 54 and the receptacle together. The connector 54 can only be removed from the receptacle after manually depressing the spring 77 to release the catch 76 from the receptacle housing. The spring 77 is located within a notch 78 in the second housing section 56 and has a shaped end 79 which engages a corresponding rib 80 on the second housing section 56 to retain the spring 77 in the housing section 56 after the connector 54 is assembled.

Figures 3, 4, 5, 6, 7, 8, 10, 11, 12, 13, 14, 15:
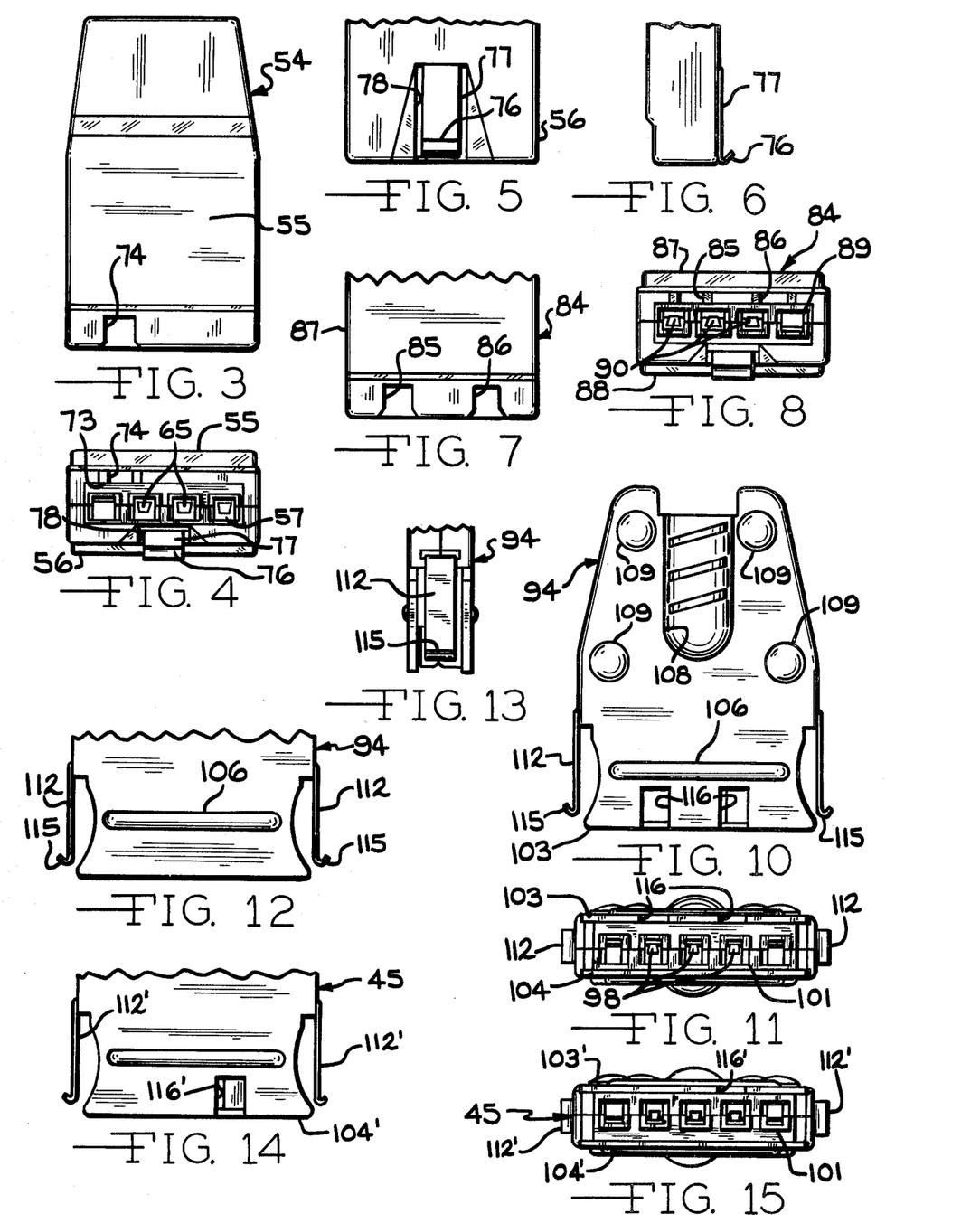
FIG. 3 is a top plan view of the connector of FIG. 2.
FIG. 4 is an end view of the connector of FIG. 2.
FIG. 5 is a fragmentary bottom plan view of the connector of FIG. 2.
FIG. 6 is a fragmentary side view of the connector of FIG. 2.
FIG. 7 is a fragmentary top plan view of a modified embodiment of the connector of FIG. 2 showing a different key arrangement.
FIG. 8 is an end view of the modified connector of FIG. 7.
FIG. 10 is a top plan view of the connector of FIG. 9.
FIG. 11 is an end view of the connector of FIG. 9.
FIG. 12 is a fragmentary back view of the connector of FIG. 9.
FIG. 13 is a fragmentary side view of the connector of FIG. 9.
FIG. 14 is a fragmentary top plan view showing a modified embodiment of the connector of FIG. 9 with a different key arrangement.
FIG. 15 is an end view of the modified connector of FIG. 14.
Figure 9:
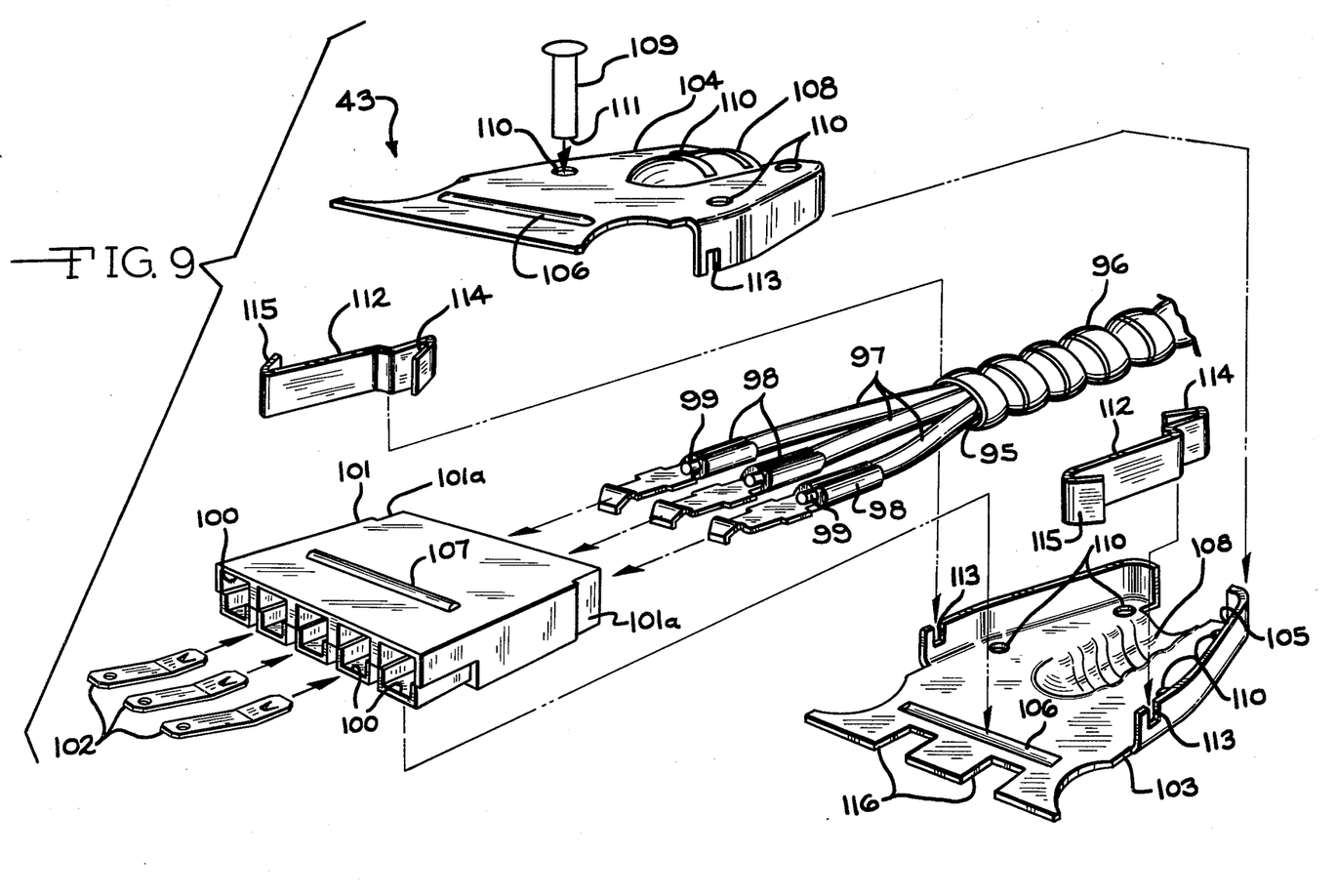
FIG. 9 is an exploded perspective view of a modified connector for use in the system of the present invention.

In the exemplary lighting system 30 shown in FIG. 1, the receptacles will be used to determine the direction of power flow. If power flows into a receptacle, the receptacle will be termed an input receptacle and, arbitrarily, will be provided with a single key for receiving a mating input connector having a single notch, such as the single notch 74 in the connector 54. If power flows from a receptacle, then the receptacle will be termed an output receptacle and will be provided with two spaced keys for receiving a connector having two separate notches. Of course, other keying configurations may be used for the connectors and receptacles. FIGS. 7 and 8 show a fragmentary portion of an output connector 84 which is similar to the input connector 54 of FIGS. 2–6, except that two keying notches 85 and 86 are provided in a first housing section 87. A second housing section 88 is identical to the previously described housing section 56. It will be noted that the connector 84 is provided with an insulator block 89 containing terminals 90 which is upsidedown with respect to the insulator block 57 for the connector 54. This prevents inserting the connector 84 into a receptacle adapted for the connector 54. In a modified embodiment the notches 85 and 86 in the connector 84 may be misaligned with the notch 74 in the connector 54.

Turning now to FIGS. 9–13, the output connector 43 from FIG. 1 is shown in detail. The connector 43 which is a modification of the connector 54, is attached to an end 95 of a flexible shielded cable 96. The cable 96 is shown as carrying three wires 97, although up to five wires may be located within the cable 96. Each of the wires 97 terminates at a terminal 98 which is crimped onto an electrical conductor 99 in such wire 97. The three terminals 98 are received by a preselected three of five openings 100 in an insulator block 101 and are held in place by means of spring retainers 102. The connector 43 has a housing comprising a first housing section 103 an a second housing section 104. The housing sections 103 and 104 are stamped from sheet metal and adapted to fit together to form an interior opening 105 therebetween for receiving the cable end 95 and the insulator block 101. Grooves 106 are formed in the housing sections 103 and 104 for receiving ribs 107 in the insulator block 101 for retaining the insulator block 101 within the housing opening 105. The housing sections 103 and 104 are also stamped with semi-circular or helical grooves 108 for receiving and tightly engaging the cable end 85 when the connector 43 is assembled. In assembling the connector 43, four rivets 109 are passed through aligned openings 110 in the housing sections 103 and 104 and the rivet ends 111 are deformed to permanently connect the housing sections 103 and 104 together. Spring clips 112 are inserted within openings 113 on either side of the housing sections 103 and 104 while assembling the connector 43. The spring clips 112 have shaped ends 114 which pass through the openings 113 and resiliently engage recesses 101a on sides of the insulator block 101. The spring clips 112 also have an end 115 which forms a catch for engaging a receptacle when the connector 43 is inserted therein. Thus, the spring clips 112 form a strong metallic catch for locking the connector 43 into a receptacle when a lighting system is assembled. The connector and receptacle will remain together until the spring clips 112 are manually depressed. The connector 43 is designed for use in receiving power from a receptacle and, therefore, is provided with two notches 116 in the housing section 103. When a connector is needed for supplying power to a receptacle, as the input connector 45 in FIG. 1, a single notch 116' is provided in the second housing section 103' to form the connector 45, as shown in fragmentary in FIGS. 14 and 15. All other elements of the connectors 45 and 43 are identical, except that insulator block 101 is inverted with respect to the housing sections 103' and 104.

Figures 16, 17:
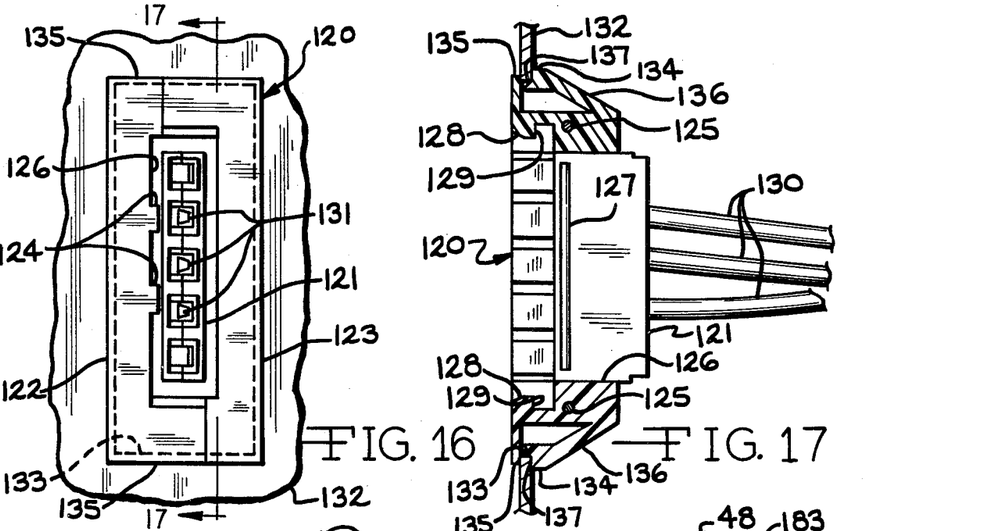
FIG. 16 is a top plan view of a receptacle for using in the system of the present invention.
FIG. 17 is a cross sectional view taken along lines 17—17 of FIG. 16.

Referring now to FIGS. 16 and 17, details are shown for an output receptacle 120 which may be used, for example, as the receptacles 36–38 on the junction box 31 in FIG. 1. The receptacle 120 includes an insulator block 121 mounted within a housing formed from two housing sections 122 and 123. The housing section 122 is provided with two keys 124 which are spaced to receive corresponding notches on an output connector, such as the notches 116 on the connector 43 shown in FIGS. 1 and 9–13. In the event that the receptacle 120 is to be used as an input receptacle, one of the key 124 is omitted from the housing section 122 and the insulator block 121 is reversed in the housing sections 122 and 123 to mate with the input connector 45, shown in fragmentary in FIGS. 14 and 15.

The housing sections 122 and 123 are identical, except for the presence of the keys 124 on the section 122. The sections 122 and 123 are connected together by means of rivets 125. When connected together, the housing sections 122 and 123 form an opening or chamber 126 which recieves and holds the insulator block 121. The housing sections 122 and 123 are provided with suitable grooves for receiving ribs 127 on the insulator block 121 to retain the insulator block 121 in place. The ends of the chamber 126 are provided with chamfers 128 which deflect the connector spring clips, such as the spring clips 112 on the connector 43, when a connector is inserted into the receptacle 120. When the connector is firmly seated, the catch 115 on the end of each spring clip 112 engages a notch or groove 129 formed at each end of the chamber 126 for locking the connector 43 and the receptacle 120 together.

The connector 120 is shown with three wires 130 terminating at the insulator block 121. The wires 130 are connected to terminals (not shown) within the insulator block 121 which are identical to the terminals 98 in the connector 43. The insulator block 121 is also identical to the insulator block 101 in the connector 43 and is in a reverse or inverted orientation with respect to the keys 124 as the insulator block 101 is to the notches 116 in the connector 43. As a consequence, the connector 94 can be inserted and locked into the receptacle 120.

The receptacle 120 is designed to be mounted in a rectangular opening in a plate, such as in the junction box 31 shown in FIG. 1. A similar mounting arrangement is provided for an input receptacle in a lighting fixture or other article to which power is to be supplied. As shown in FIGS. 16 and 17, a supporting plate 132 is provided with a rectangular opening 133 for mounting the output receptacle 120. Resilient latches 134 are formed at opposite ends 135 of the receptacle 120 for engaging the plate 132. The latches 134 are provided with a camming surface 136 which deflect the latches 134 as the receptacle 120 is pressed into the plate opening 133. When the receptacle 120 is seated within the opening 133, the latches 134 spring outwardly until a surface 137 on each latch 134 engages the plate 132. Thus, the latches 134 rigidly connect the receptacle 120 to the plate 132.

Turning now to FIGS. 18–22 details are shown for the circuit connector module 47 from FIG. 1. The circuit connector module 47 generally includes the input receptacle 46, the output receptacle 48 and the connector 49 which engages a mating receptacle, such as a receptacle 50 on the lighting fixture 34. The receptacles 46 and 48 and the connector 49 are mounted in a T-shaped housing which consists of a generally flat, rectangular housing section 140 and two right angle housing sections 141 and 142. A plurality of terminals, of which three terminals 143, 144, and 145 are shown, are located within separate openings 146 in an insulator block 147 and are held in place by means of spring retainers 148 to form the connector 49. The insulator block 147 is clamped between the two housing sections 141 and 142 and is permanently held in place by means of ribs 149 on opposite sides of the insulator block 147 which are received by grooves 150 in the housing sections 141 and 142. The housing sections 141 and 142 are permenently connected together with pins 151 which project from the housing section 141 through aligned openings 152 in the housing section 142 and are permanently deformed. Before assembling the housing sections 141 and 142 together, spring clips 153 are positioned in slots 154 in opposite sides of each of the housing sections 141 and 142. The spring clips 153 are identical to the previously described spring clips 112 and include catches 155 for engaging and locking the connector 49 to a mating receptacle. To complete the connector 49, keying is provided in the housing section 141. As shown in the drawings, the connector 49 is provided with a single key notch 156 in the housing section 141 to permit inserting the connector 49 into an input receptacle, such as the receptacle 50 on the lighting fixture 34 in FIG. 1.

Figure 18:
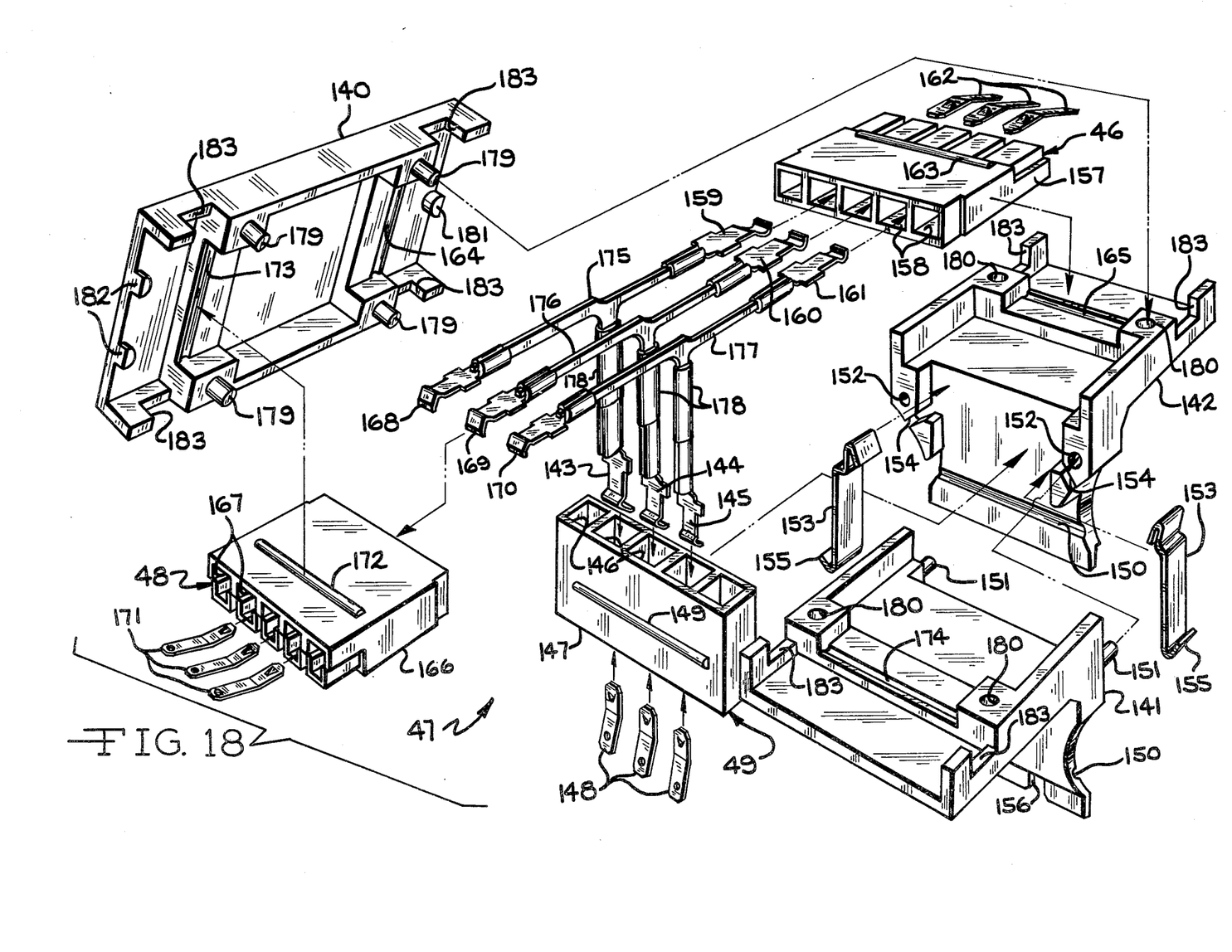
FIG. 18 is an exploded perspective view of a circuit connector module for use in the system of the present invention.
Figures 19, 20:
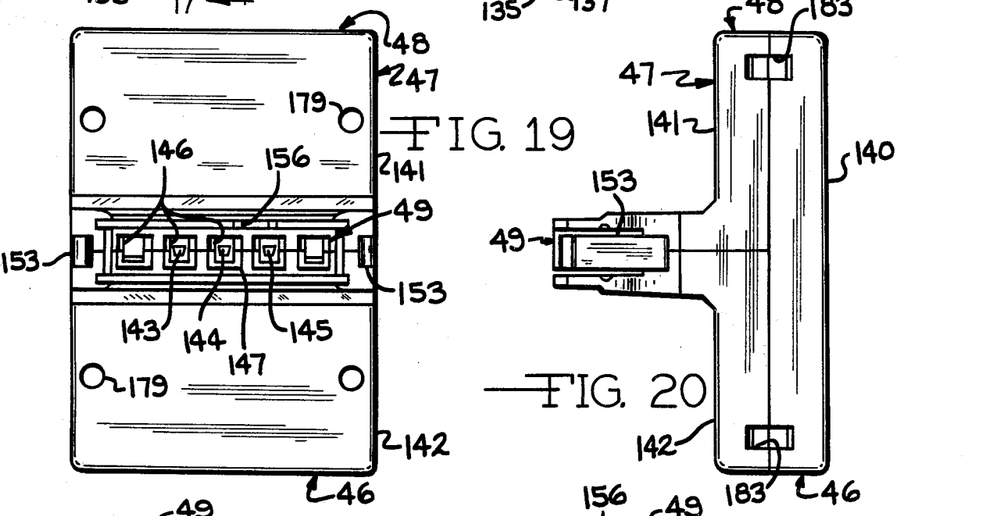
FIG. 19 is a bottom view of the circuit connector module of FIG. 18.
FIG. 20 is a side view of the circuit connector module of FIG. 18.
Figure 21:
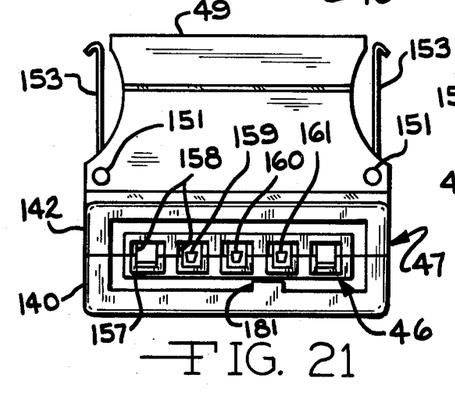
FIG. 21 is a first end view of the circuit connector module of FIG. 18.
Figure 22:
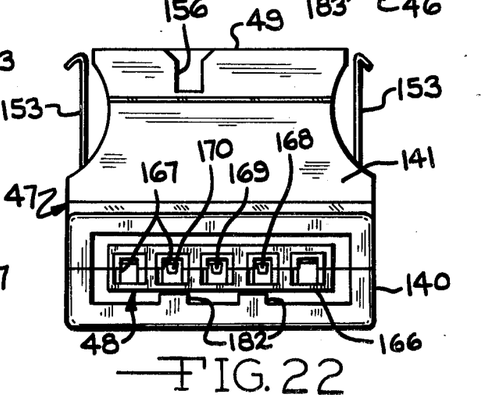
FIG. 22 is a second end view of the circuit connector module of FIG. 18.

The connector 46 includes an insulator block 157 having a plurality of openings 158 for receiving terminals, of which three terminals 159-161 are shown. The terminals 159-161 are received by individual ones of the openings 158 and are held in place by means of spring retainers 162. The insulator block 157 is provided with ribs 163, one of which is received by a groove 164 in the housing section 140 and a second of which is received by a groove 165 in the housing section 142.

Like the receptacle 46, the receptacle 48 includes an insulator block 166 having a plurality of spaced openings 167 which receive individual ones of a plurality of terminals 168-170. The terminals 168-170 are held within the openings 167 by spring retainers 171. The insulator block 166 is provided with ribs 172 on opposite sides, one of which engages a groove 173 in a housing section 140 and the other of which engages a groove 174 in the housing section 141 for rigidly retaining the insulator block 166 in place. Electrical circuit continuity through the circuit connector module 47 is maintained by a bus bar 175 which interconnects the terminals 143, 159 and 168, a bus bar 176 which interconnects the terminals 144, 160 and 169 and a bus bar 177 which interconnects the terminals 145, 161 and 170. The individual terminals 143-145, 159-161 and 168-170 are crimped onto the bus bars 175-177 with sufficient force to establish a positive electrical connection therebetween. When necessary, electrical insulation may be placed over the bus bars 175-177, or portions thereof, such as the insulating sleeves 178 positioned on the bus bars 175-177 immediately above the terminals 143-145.

In assembling the circuit connector module 47, the insulator block 147 and the spring clips 153 are first positioned between the housing sections 141 and 142 and the housing sections are connected together by means of the pins 151. The terminals 159-161 on the bus bars 175-177 are then positioned in selected ones of the openings 158 in the insulator block 157 and the terminals 168-170 on the bus bars 175-177 are positioned in selected ones of the openings 167 in the insulator block 166. Next, the terminals 143-145 on the bus bars 175-177 are inserted into preselected openings 146 in the insulator block 147. At this point, one of the ribs 163 on the insulator block 157 engages the groove 165 on the housing section 142 and one of the ribs 172 on the insulator block 166 engages the groove 174 on the housing section 141. Finally, the housing section 140 is positioned over the insulator blocks 157 and 166 and pins 179 on the housing section 140 are inserted into aligned openings 180 in the housing sections 141 and 142. The pins 179 are then deformed to lock the housing sections 140, 141 and 142 permanently together.

The housing section 140 has a single key 181 at one end and two keys 182 at an opposite end. The single key 181 on the housing section 140 limits the receptacle 46 to an input receptacle capable of receiving connectors such as the connector 45 described above, and the two keys 182 on the housing section 140 limits the receptacle 48 to an output receptacle capable of receiving only corresponding output connectors, such as the connector 43 described in detail above. It will be noted that openings 183 are formed in the sides of the housing sections 140-142 adjacent edges of the connectors 46 and 48. The openings 183 are designed to receive the spring clips, such as the spring clips 112 on the connector 43 and the spring clips 112' on the connector 45 to retain such connectors in the receptacles 46 and 48.

Figures 23, 24:
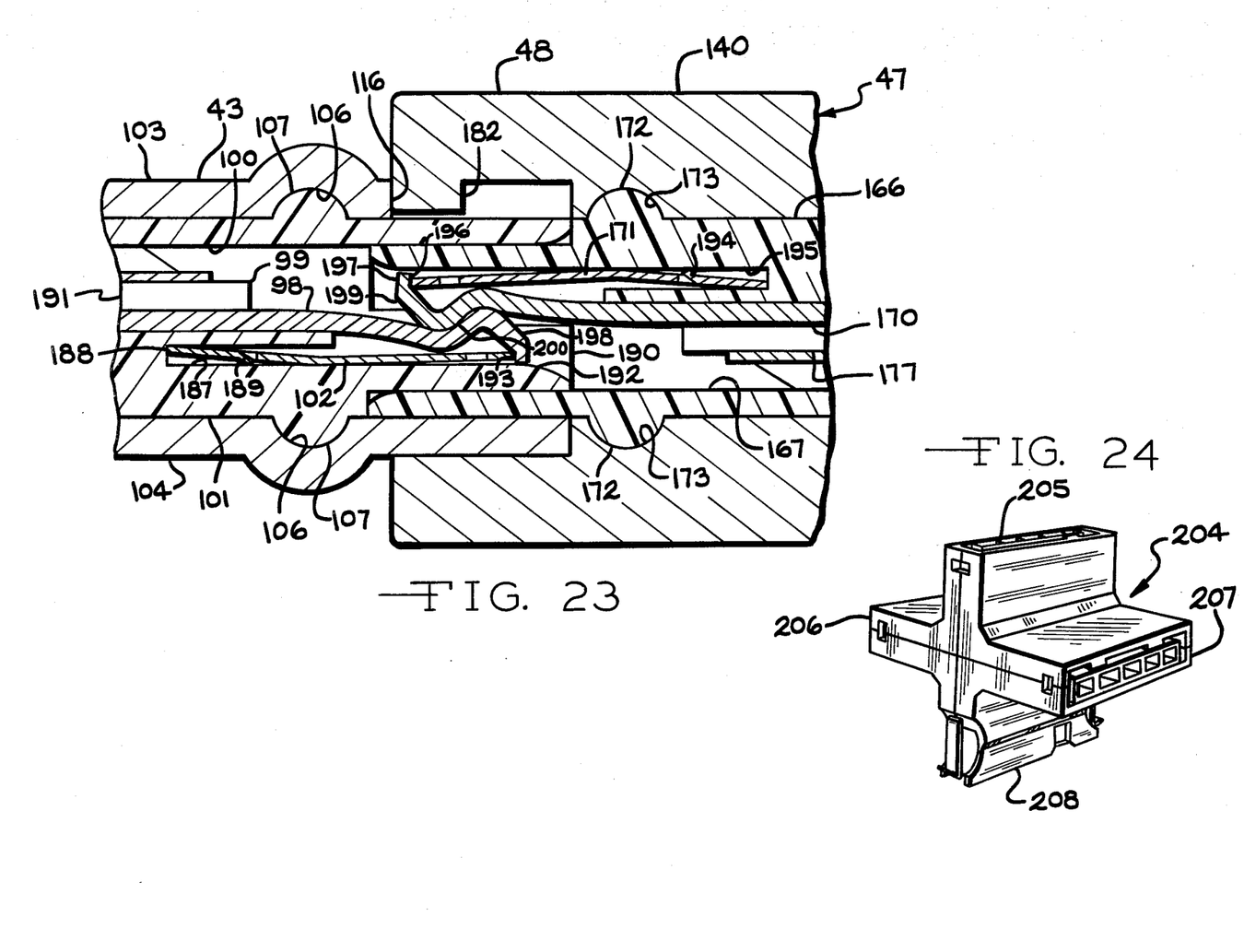
FIG. 23 is a fragmentary cross sectional view taken along line 23—23 of FIG. 2 and showing a mating portion of a connector on a branch circuit cable and a receptacle in a circuit connector module.
FIG. 24 is a perspective view of a modified circuit connector module with an additional set of terminals for connection to a wall switch for switching power in the branch circuit.

Additional details in the manner in which the various connectors and receptacles mate is shown in FIG. 23 which is a fragmentary sectional view through the mating output connector 43 and the output receptacle 48 in the circuit connector module 47 from FIG. 1. The terminal opening 100 in the insulator block 101 for the connector 43 is shaped to form a recess or groove 187 for receiving an end 188 of the spring retainer 102. The spring retainer 102 is held within the groove 187 by means of an integral stamped resilient tab 189. The total thickness of the spring retainer 102 and the tab 189 is greater than the width of the groove 187 such that the tab 189 engages the insulator block 101 when the spring retainer 102 is inserted into the groove 187. It will be noted that the spring retainer 102 is inserted from an outer end 190 of the opening 100 while the terminal 98 is inserted from an inner end 191 of the opening 100. When the terminal 98 is inserted into the opening 100 to a seated position, the spring retainer 102 is deflected towards a wall 192 of the opening 100 until it engages a hooked end 193 on the terminal 98. Engagement between the spring retainer 102 and the hooked end 193 on the terminal 98 prevents withdrawing the terminal 98 through the insulator block opening 100 towards the end 191. The terminal 170 is similarly retained within the opening 167 in the insulator block 166 of the receptacle 48. The spring retainer 171 includes an integral tab 194 which engages the insulator block 166 when the spring retainer 171 is inserted into a recess or groove 195 formed in the opening 167. When the terminal 170 is then inserted into the opening 167, an end 196 on the spring retainer 171 engages a hooked end 197 on the terminal 170 to lock the terminal 170 within the insulator block opening 167. A beveled or camming surface 198 is formed on the terminal 98 adjacent the hooked end 193 and a similar beveled or camming surface 199 is formed on the terminal 170 adjacent the hooked end 197. As the connector 43 is inserted into the receptacle 48, the camming surfaces 198 and 199 collide and cause the terminals 98 and 170, respectively, to deflect away from each other. When the connector 43 is firmly seated within the receptacle 48, electrical contact is made between the terminals 98 and 170 at a surface area 200 and a positive electrical contact is maintained through the resiliency of the terminals 98 and 170 and the spring retainers 102 and 171.

It should be noted that in some instances, it is desirable to splice two of the branch circuit cables together. For example, if the lighting fixture 35 shown in the lighting system 30 of FIG. 1 is eliminated in relocating such system 30, either the branch circuit cables 40 and 41 may be spliced together or the two cables may be replaced with a single longer cable if such a cable is available. Also, it is generally desirable to limit the length of the cables to no more than twenty feet to facilitate handling and installation of the cables. The circuit connector module 47 is readily modified to form a cable splicing or interconnecting module merely by eliminating the connector 49 from the circuit connector module 47. The resulting splicing module will have a flat appearance, as distinguished from a generally T-shaped appearance, and will include only the two receptacles 46 and 48 having corresponding terminals which are connected together by internal bus bars.

Turning now to FIG. 24, a circuit connector and switching module 204 is shown in perspective. The circuit connector and switching module 204 is similar to the previously described circuit connector module 47, except that an additional receptacle 205 is provided for connection through a circuit cable to a wall switch. The circuit connector and switching module 204 includes an input receptacle 205, an output receptacle 207, a switch receptacle 206 and an input connector 208 which are identical in construction to the receptacles 46 and 48 and the connector 49, respectively, previously described for the circuit connector module 47. The receptacle 205 also is identical to the input receptacle 46 so as to receive an input connector on a cable such as the connector 45. Of course, it should be appreciated that the location of the input receptacle 205, the output receptacle 207 and the switching receptacle 206 may be rearranged with respect to the connector 208. Internal connectors in the module 204 are established with bus bars such that an external switch connected to the receptacle 206 controls the application of power from the input receptacle 205 to one or both of the output receptacle 207 and the connector 208.

Figure 25:
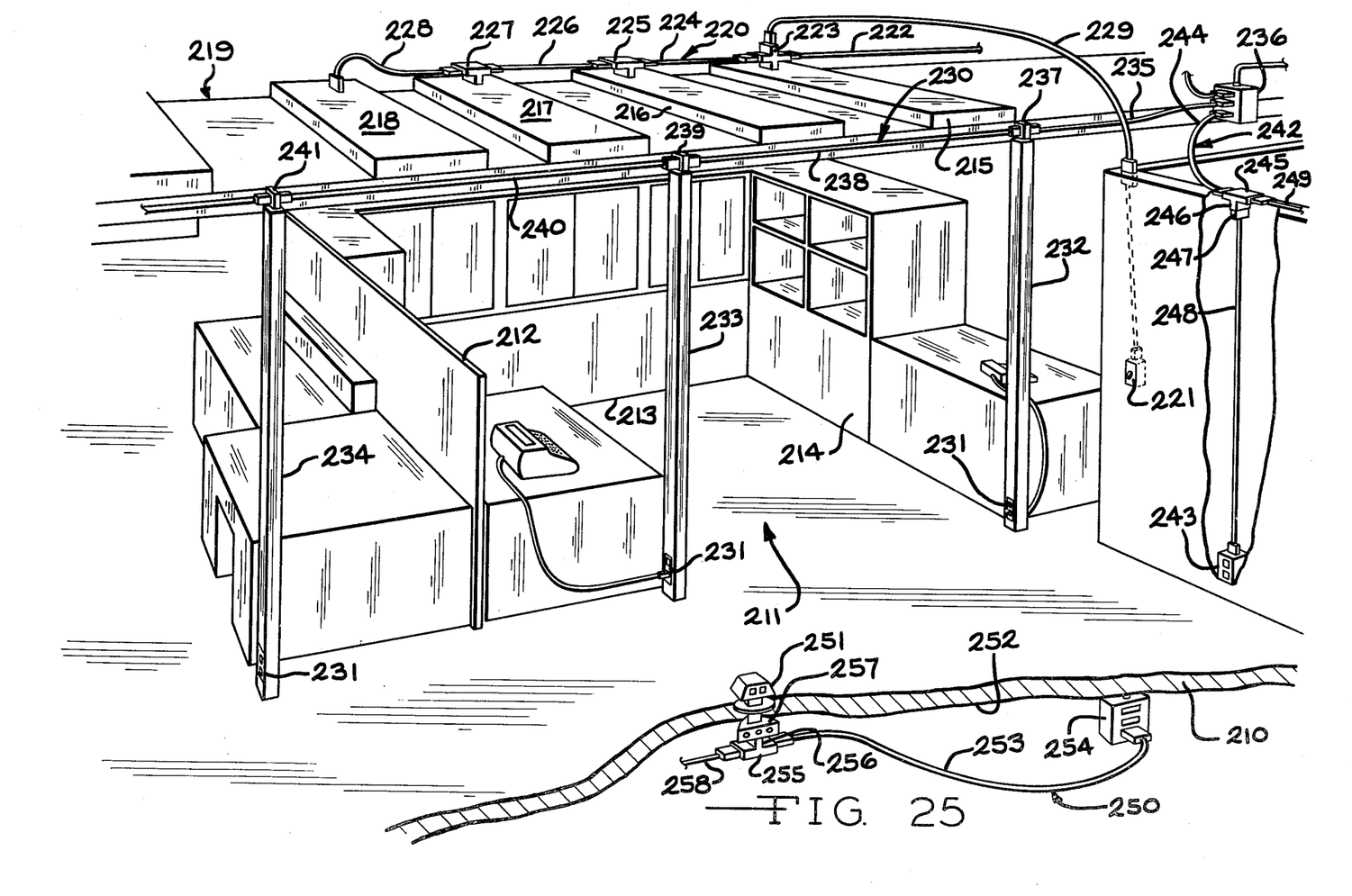
FIG. 25 is a fragmentary perspective view of a portion of a building showing the use of the system of the invention for supplying power to lighting fixtures and to electrical outlets.

Turning now to FIG. 25, a fragmentary perspective view is shown for a portion of a building floor 210 which is divided into individual rooms or office areas by means of partitions. One such office 211 is formed by means of two partitions 212 and 213 and a cabinet 214. A plurality of lighting fixtures 215–218 are located in a ceiling structure 219 over the office 211. The fixtures 215–218 are connected to a branch circuit 220 and they are controlled by means of a wall switch 221. The branch circuit 220 includes a branch circuit cable 222 which supplies power to a circuit connector and switching module 223 which is in turn plugged into a receptacle mounted in the lighting fixture 215. The circuit connecting and switching module 223 is in turn connected through a branch circuit cable 224 to a circuit connector 225 plugged into the lighting fixture 216. Similarly, the circuit connector module 225 is connected through a branch circuit cable 226 to a circuit connector module 227 plugged into the lighting fixture 217 and thence through a branch circuit cable 228 directly to the lighting fixture 218. The wall switch 221 is connected through a circuit cable 229 to the circuit connecting and switching module 223 such that the wall switch 221 controls power in all four lighting fixtures 215–218. From the above description of the branch circuit 220, it will be readily apparent that electrical connections to the fixtures 215–218 may be readily modified to meet changing lighting control requirements by relocating the cables 222, 224, 226, 228 and 229. Since the various connectors, receptacles and connector modules are keyed to prevent erroneous or dangerous connections, the relocation of the branch circuit 220 is easily accomplished with a minimum amount of technical skill. At no time is it necessary for an electrician to modify the wiring within the lighting fixtures 215–218 or to come into contact with exposed electrical conductors.

In addition to the branch circuit 220, a branch circuit 230 is provided for supplying 120 volt AC power, or standard power, to convenience outlets 231 located on relocatable power poles, of which three poles 232, 233 and 234 are shown. A branch circuit cable 235 applies power from a junction box 236 to a receptacle in a circuit connector 237 mounted at the top of the power pole 232. Similarly, a branch circuit cable 238 is connected from the circuit connector 237 to a circuit connector 239 located at the top of the power pole 233 and a branch circuit cable 240 is connected from the circuit connector 239 to a circuit connector 241 located at the top of the power pole 234. The circuit connectors 237, 239 and 241 mounted at the tops of the relocatable power poles 232–234, respectively, each include an input receptacle and an output receptacle which are electrically connected together and also are connected to the convenience outlet at the base of such power pole 232–234.

A third branch circuit 242 is connected to the junction box 236 for supplying power to conventional wall mounted convenience outlets, of which a single outlet 243 is shown in FIG. 25. A branch circuit cable 244 is connected between the junction box 236 and a circuit connector module 245. In place of a lighting fixture, the circuit connector module 245 has a connector 246 which is attached to a receptacle 247. The receptacle 247 is connected through a cable 248 to the convenience outlet 243. The output receptacle in the circuit connector module 245 is connected to another branch circuit cable 249 which may be connected to another convenience outlet 243 or to a convenience outlet in a relocatable power pole, such as the outlets 231.

Still another form of a branch circuit 250 is shown for supplying power to floor mounted convenience outlets 251. The branch circuit 250 is located within a plenum area 252 below the floor 210. The branch circuit 250 includes a branch circuit cable 253 connected from a junction box 254 to a circuit connector module 255. The circuit connector module 255 has an input connector 256 which is connected to a receptacle in a junction box 257 mounted immediately below and permanently wired to the convenience outlet 251 so that power is applied from the junction box 254 through the cable 253 and the circuit connector module 255 to the outlet 251. A second branch circuit cable 258 is connected to the circuit connector module 255 for applying power to additional floor mounted convenience outlets 251 or to any other desired component, such as to a power pole (not shown) in a room or area below the floor 210. In the event that only the outlet 251 is connected in the branch circuit 250 or the outlet 251 is at the end of a branch circuit, the circuit connector module 255 is eliminated and the branch circuit cable 253 is plugged directly into the receptacle in the box 257.

In many instances, the lighting system for a building is operated at a considerably higher voltage than the convenience outlets for the same building. For example, commercial fluorescent lighting fixtures are sometimes operated at 277 volts AC while convenience outlets are provided with 110 to 120 volts AC. To prevent erroneous power connections which may result in a hazardous condition, the connectors and receptacles used at the higher voltage are different from and will not engage the connectors and receptacles for the lower voltage. For example, the branch circuit 220 supplying the lighting fixtures 215-218 may be operated with branch circuit cables having inlet connectors such as the previously described connectors 45 and outlet connectors such as the connectors 43 attached thereto. These connectors 45 and 43 are used in combination with the circuit module 47 for applying power to the lighting fixtures. The lower voltage applied to the convenience outlets is supplied through branch circuit cables having attached thereto connectors such as the inlet connectors 54 and the outlet connectors 84. A modified circuit connector module and modified receptacles are provided for interconnecting with the inlet and outlet connectors 54 and 84. It should be appreciated from viewing the drawings that the inlet connector 54 and the outlet connector 55 will not engage the inlet receptacle 46 or the outlet receptacle 48 on the circuit connector module 47. Nor will the inlet connector 45 or the outlet connector 43 engage receptacles adapted to receive the inlet connector 54 or the outlet connector 84. Therefore, two separate branch circuits are provided for handling different voltages and which cannot be interconnected by mistake.

It will be appreciated that various changes and modifications in the above described relocatable wiring system for supplying power to lighting fixtures, convenience outlets and other applications may be made without departing from the spirit and the scope of the following claims.

What I claim is:

1. A relocatable power distribution system for a floor area in a building comprising, in combination, a plurality of lighting fixtures supported by a ceiling structure to light the floor area, each fixture having mounted thereon at least one lamp, at least one lighting circuit for energizing said lamp and a first receptacle having a plurality of terminals recessed in an insulator block and connected to supply power to said lighting circuit, said first receptacle having a housing mounting said insulator block, at least one circuit connector module having a housing, a first connector and second and third receptacles, said first connector and said second and third receptacles each having a plurality of terminals recessed in an insulator block mounted in said module housing, means electrically interconnecting corresponding ones of said terminals in said first connector and said second and third receptacles, a plurality of branch circuit cables each having two ends, a second connector having a housing mounted on one of said ends and a third connector having a housing mounted on the other of said ends, said second and third connectors each having a plurality of terminals recessed in an insulator block mounted in said housing for such connector, conductor means in said cable interconnecting corresponding ones of said terminals in said second and third connectors, said first receptacle receiving said first connector in a first predetermined orientation, said second receptacle receiving said second connector in a second predetermined orientation and said third receptacle receiving said third connector in a third predetermined orientation, first keying means in said first receptacle housing and said module housing for restricting said first connector to said first predetermined orientation when received by said first receptacle, second keying means in said second connector housing and said module housing for restricting said second connector to said second predetermined orientation when received by said second receptacle, third keying means in said third connector housing and said module housing for restricting said third connector to said third predetermined orientation when received by said third receptacle, said second keying means including means for preventing said second connector from being received by either of said first and third receptacles and means for preventing said second receptacle from receiving either of said first and third connectors, means for locking said first connector in said first receptacle, means for locking said second connector in said second receptacle, means for locking said third connector in said third receptacle, and means for applying power from a power source to one of said branch circuit cables whereby power is supplied through said branch circuit cables and said circuit connector modules to energize said lighting circuits in said lighting fixtures.

2. A relocatable power distribution system, as set forth in claim 1, and wherein said insulator blocks for said first, second and third receptacles and for said first, second and third connectors are identical.

3. A relocatable power distribution system, as set forth in claim 2, wherein said second and third connector housings and said module housing are of metal.

4. A relocatable power distribution system, as set forth in claim 2, wherein said first and third keying means are identical and said first and third predetermined orientations are identical, whereby said first receptacle can recieve said third connector.

5. A relocatable power distribution system for supplying power to lighting fixtures and to outlets in a building comprising at least one first branch circuit supplying power at a first voltage to said lighting fixtures and at least one second branch circuit supplying power at a second voltage to said outlets, each branch circuit including a plurality of branch circuit cables terminating in a first connector at one end and at a second connector at a second end and having a plurality of conductors interconnecting corresponding terminals in said first and second connectors, a plurality of circuit connector modules each having a first receptacle receiving a first connector on one branch circuit cable, a second receptacle receiving a second connector on a different branch circuit cable, a third connector and conductor means interconnecting corresponding terminals in said first and second receptacles and said third connector, keying means on said first connectors and said first receptacles in each branch circuit for preventing connection between such first receptacle and any of said second connectors for such branch circuit and said first, second and third connectors for the other branch circuit, keying means on said second connectors and said second receptacles in each branch circuit for preventing connections between such second receptacle and said first connectors for such branch circuit and said first, second and third connectors for the other branch circuit, means connecting each third connector in said first branch circuit to a different lighting fixture, means connecting each third connector and said second branch circuit to a different outlet, means for applying power from a first voltage source to said first branch circuit, and means for applying power from a second voltage source to said second branch circuit.

6. A relocatable power distribution system for supplying power to lighting fixtures and to outlets in a building, as set forth in claim 5, wherein said first, second and third connectors and said first and second receptacles each includes a housing enclosing an insulator block having terminals recessed therein, wherein said insulator blocks for said connectors and receptacles in said first branch circuit are identical, wherein said insulator blocks for said connectors and receptacles in said second branch circuit are identical, and wherein said keying means includes said housings for said connectors and said receptacles.

* * * * *